(12) United States Patent
Abe et al.

(10) Patent No.: US 7,731,015 B2
(45) Date of Patent: Jun. 8, 2010

(54) CHAINLESS CONTAINER-TRANSPORTING DEVICE

(75) Inventors: Kazuo Abe, Tokushima (JP); Takayoshi Kamiji, Tokushima (JP)

(73) Assignee: Shikoku Kakoki Co., Ltd., Itano-gun (JP)

( * ) Notice: Subject to any disclaimer, the term of this patent is extended or adjusted under 35 U.S.C. 154(b) by 803 days.

(21) Appl. No.: 10/578,749

(22) PCT Filed: Nov. 11, 2004

(86) PCT No.: PCT/JP2004/016741

§ 371 (c)(1),
(2), (4) Date: Jan. 23, 2007

(87) PCT Pub. No.: WO2005/047113

PCT Pub. Date: May 26, 2005

(65) Prior Publication Data

US 2007/0125623 A1    Jun. 7, 2007

(30) Foreign Application Priority Data

Nov. 12, 2003    (JP) .............................. 2003-383030

(51) Int. Cl.
*B65G 37/00* (2006.01)

(52) U.S. Cl. .................... 198/620; 198/626.1; 198/604; 198/867.06

(58) Field of Classification Search .............. 198/626.1, 198/620
See application file for complete search history.

(56) References Cited

U.S. PATENT DOCUMENTS 3,017,731 A * 1/1962 Lohse .......................... 53/201

(Continued)

FOREIGN PATENT DOCUMENTS

EP    0 844 180 A1    5/1998

(Continued)

OTHER PUBLICATIONS

Supplementary European Search Report dated Dec. 19, 2007, issued in corresponding European Patent application No. 04 81 8496.

(Continued)

*Primary Examiner*—Gene Crawford
*Assistant Examiner*—Kavel P Singh
(74) *Attorney, Agent, or Firm*—Westerman, Hattori, Daniels & Adrian, LLP (57) ABSTRACT

The present invention provides a container-transporting device which fundamentally avoids the problems caused by elongations and the structure of endless chains, which is inevitably created by using endless chains in the container-transporting conveyors for conventional filling-and-packaging machines. It is a container-transporting device for holding and transporting a square-cylindrical container 36 by a container holder 34 formed between container-transporting means 32 and 33 disposed to face parallel with each other, wherein the container conveying means 32 and 33 are equipped with: a number of blocks 40 having a holding part 38 constituting a part of a container holder 34; outward block-support members 42 and homeward block-support members 44, arranged by extending in the conveying direction, for supporting a number of blocks 40 in a movable condition along the conveying direction; a first transfer means 46 capable of sequentially transferring the blocks 40 that have been conveyed while being supported by the outward block-support members 42 to the homeward block-support members 44; a second transfer means 48 capable of sequentially transferring the blocks 40 that have been conveyed while being supported by the homeward block-support members 44 to the outward block-support members 42; and a block delivering means 50 capable of delivering and conveying the blocks 40 so that each block 40 can be circulated.

26 Claims, 9 Drawing Sheets

U.S. PATENT DOCUMENTS

| | | | |
|---|---|---|---|
| 4,590,643 A * | 5/1986 | Hill | 452/112 |
| 4,863,010 A * | 9/1989 | Proksa et al. | 198/626.1 |
| 5,090,557 A * | 2/1992 | Carmen | 198/626.1 |
| 2005/0076613 A1* | 4/2005 | Jacobs et al. | 53/167 |
| 2005/0108994 A1* | 5/2005 | Jacobs et al. | 53/510 |

FOREIGN PATENT DOCUMENTS

| | | |
|---|---|---|
| JP | 6-298226 | 10/1994 |
| JP | 11-502802 | 3/1999 |
| JP | 2003-48612 | 2/2003 |
| WO | WO 96/30261 | 10/1996 |

OTHER PUBLICATIONS

International Preliminary Report on Patentability of PCT/JP2004/016741, date of mailing Aug. 3, 2006 w/English translation.

International Search Report of PCT/JP2004/016741, date of mailing Mar. 1, 2005.

* cited by examiner

CHAINLESS CONTAINER-TRANSPORTING DEVICE

TECHNICAL FIELD

The present invention relates to a container-transporting device which is equipped, for example, on a filling machine for filling milk cartons and the like with contents.

BACKGROUND ART

Figure 9:
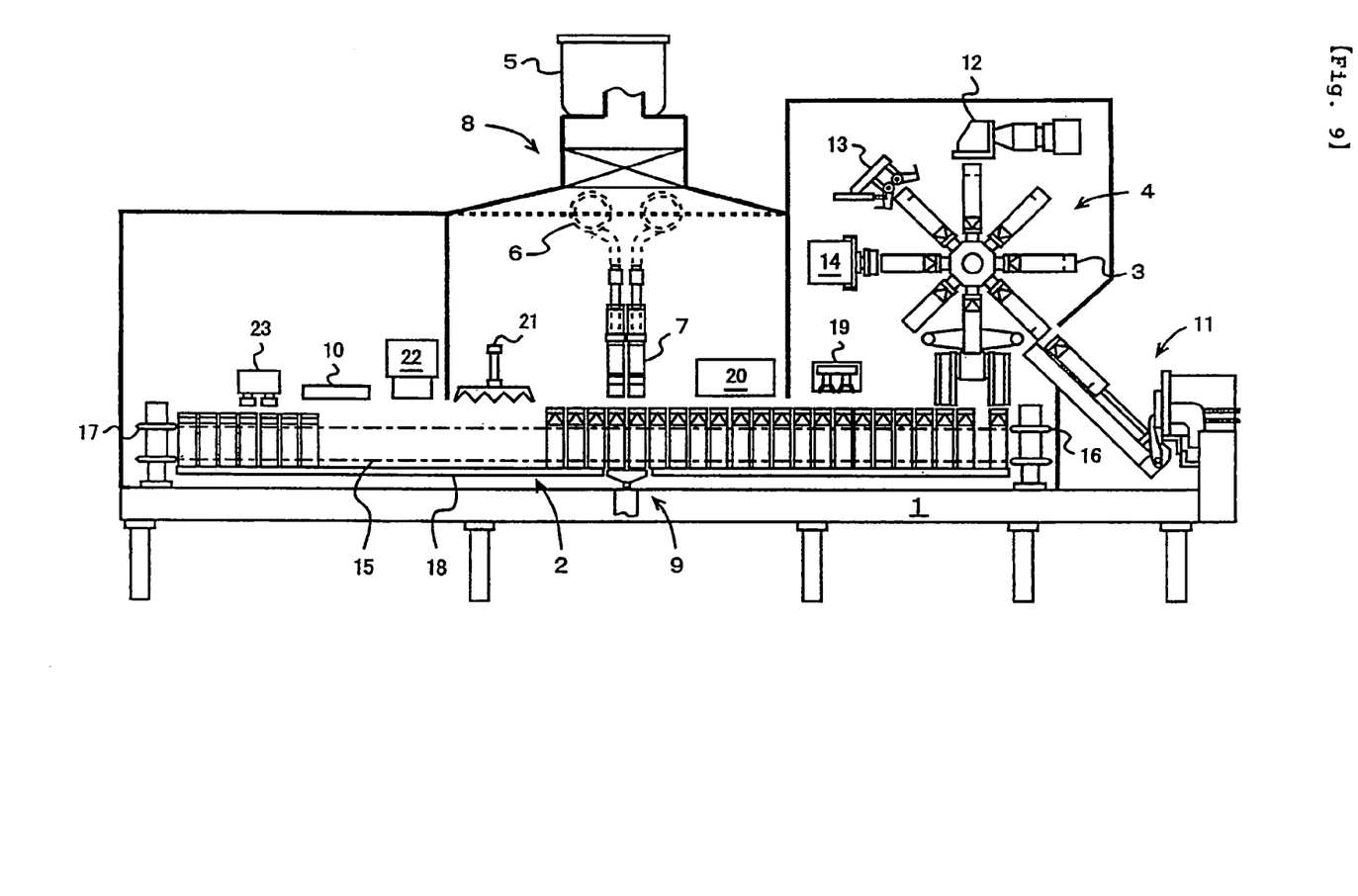
FIG. 9 is a schematic explanatory drawing of a filling- and packaging machine equipped with a conventional chain container-transporting device.

Conventionally, a high-speed liquid-filling machine equipped with a filling station illustrated in FIG. 9 for example, is known as a high-speed liquid-filling machine for filling liquid such as milk and juice to paper containers. Such a high-speed liquid-filling machine is equipped with: a machine frame 1 having a filling station; a transporting conveyor 2 capable of transporting containers in such a manner that they stop in succession at the filling station; a rotative body 4 having a radial mandrel 3, disposed upward of the starting end of the transport path of the transporting conveyor 2; a filling device 8 having a filling tank 5, a quantifying cylinder 6, and a filling nozzle 7, and a container lifting-and-lowering means 9, disposed at the filling station located in the midpoint of the transport path; a heat sealer 10 disposed on the latter half of the transport path, and so on.

Filling and packaging by the above high-speed liquid-filling machine is effected by the following steps of: unfolding a container material (carton blank) into a square-cylindrical shape, while taking it out from a magazine 11 retaining the container material which is capable of being formed into a square-cylindrical shape; inserting and setting the unfolded material in succession to the mandrel 3; heating the edged of the material that will form the bottom of the container by a bottom-heating device 12; folding flat the heated circumferential edge of the container by a container-edge folding device 13; crimping the above flat-folded edge by a container-bottom-application device 14 to form a square-cylindrical container with a bottom; and shifting the square-cylindrical container with a bottom from the mandrel to container holders fixed to endless chains 15. The above transporting conveyor 2 is comprised of: the endless chains 15 coupled with a plurality of the container holders; and a pair of sprockets 16 and 17 provided at the starting end and the terminal end of the transport path respectively, where the endless chains 15 are bridged.

The square-cylindrical containers with a bottom shifted onto the transporting conveyor are transported intermittently by the container holders fixed to the endless chains 15, over a rail 18 which provides a bottom support for and guides the containers. The square-cylindrical containers are then transported through a preparative folding device 19 which marks fold lines on the square-cylindrical containers with a bottom so that the top of the containers can be easily interfolded into a roof shape, and through a sterilizer 20 which sterilizes the inside of the container by oxygenated-water spray and/or ultraviolet irradiation, and finally reach the filling station. The square-cylindrical containers with a bottom intermittently transported and stopped at the filling station are then pushed up by the container lifting-and-lowering device 9. When the container reaches the top dead center, the filling nozzle 7 starts filling the descending container with liquid until the head of the filling nozzle 7 is withdrawn from the descended container, and the container-transporting starts almost at the same time as the filling is completed. The square-cylindrical containers with a bottom filled with liquid are then transported via a main-folding device 21 which finally interfolds the container top with the pre-folded lines into a roof shape, and via a container-top heating device 22 which heats the sealing surface of the interfolded container top. The container top is then heat-sealed by crimping by a heat sealer 10 and is printed with a date and the like by a printer 23, and then the containers are discharged as liquid-filled, packaged products.

Incidentally, chain conveyors used as container-transporting conveyors are commonly known to generate chain elongation due to abrasions of endless chains over a long period of use. For example, in roller endless chains, constituted by sequential combinations of pin links and roller links, wherein each pin link has pin link plates at both ends of the two pins, and each roller link has roller link plates at both ends of the two bushings on which the rollers are fitted rotatably, it is known that the pin and the bushing which respectively constitute slide portions are brought into contact with each other in use and hence, the pin and the bushing are abraded thus decreasing thickness thereof whereby the elongation of the endless chain is generated. The generated endless-chain elongations displace the center position of the container holders into the transporting direction resulting in various drawbacks such as the seizure of endless chain into a sprocket wheel or a conveyor rail at the time of transportation and the leaking of liquid from the container after filling besides the displacement of centering between the device such as the filling device operable in each group of devices and the container. Particularly, with respect to the displacement of centering, it has been absorbed by moving the filling device or the like in the conveying direction. However, there exists a limit with respect to the absorption of the displacement and hence, when the absorption of the displacement reached the limit, it has been determined that the lifetime of the endless chain had almost run down and the endless chains have been exchanged at the same time.

Meanwhile, as a technique for applying a preferred tension to the chains, a take-up of a chain conveyor is known, such take-up comprising: a holding arm which is freely pivotable within a given area where a driven sprocket bridged with chains is fixed at the head position and is so arranged that it can be moved closer to or further away from a drive sprocket; a biasing means biasing the holding arm into the direction to which the driven sprocket can be moved away from the drive sprocket; and a locking means which lock-releasably locks the pivot of the holding arm at any given position within the pivot area (see Japanese Laid-Open Patent Application No. 5-338758).

The latest type of this high-speed liquid-filling machine is made with a view to achieving an even higher performance (speeding up of the operation) without changing the number of rows and conveying pitches and hence, a time cycle of the intermittent operations of the conveyor is shortened. In order to conduct the given container supplying, filling, lid-material sealing and the like within this short time cycle, particularly within a short intermittent stop time, sections for container supplying, filling, lid-material sealing and the like are provided at plural sections. Providing plural sections for filling, sealing, sterilizing and the like inevitably leads to an elongated machine length. In the latest type of this filling-and-packaging machine with elongated machine length, in order to achieve higher performance, positioning accuracy of container holders transported to each station of container supplying, filling and lid-material sealing should be as precise as possible. However, as long as conventional endless chains are used in transporting conveyors, problems resulting from elongation of endless chains in use, more specifically, regular positioning adjustment of each station and replacement of endless chains for making as precise as possible the center-position accuracy of the container holders transported to each station for container supplying, filling and lid-material sealing, were simply unavoidable. Particularly, in conventional container transporting conveyor apparatuses, the drive source (drive sprocket) has to be provided at the downstream-side end of the transport path, and in this case, the displacement of the container holders due to chain elongation would arise more significantly as the distance from drive source of the transporting apparatus increases, namely, notably at the starting-end of the transport path. Hence, the container supplying device which is situated at the very starting-end side of the transport path is most susceptible to positioning displacement of container holders, which has been a serious problem. Moreover, another problem has been that, as stated above, as there is a limit to the chain-adjustment task, and chains that have elongated beyond this adjustment limit have to be replaced; and further that link parts are provided with some allowance which resulted in poor accuracy of stop position for the objects transported.

DISCLOSURE OF THE INVENTION

Problem to be Solved by the Invention

The present invention has been made in view of the above circumstances. The problem to be solved by the present invention is to provide a container-transporting device capable of fundamentally avoiding the problems caused by elongations and the structure of endless chains, which is inevitably created by using endless chains in the container-transporting conveyor of a conventional filling-and-packaging machine, and of ensuring precise positioning accuracy of container holders transported to each station for container supplying, filling and lid-material sealing in the filling-and-packaging machine.

Means for Solving the Problem

The present inventors have made a keen study to solve the above problems, and they have manufactured various container-transporting chain conveyors in terms of material and structure and the like of endless chains, and also in terms of tensioners and the like for absorbing elongations of endless chains. They have, however, reached the conclusion that any means, as long as endless chains are used, would never solve the problem fundamentally. They have therefore made a keen study to develop a chainless-container transporting device without chains and actually manufactured a chainless-container transporting device equipped with a block circulation system capable of: sequentially conveying a number of blocks having a holding part constituting a part of a container holder for holding containers, by a block-transfer means on outward block-supporting rails in the transporting direction by a given pitch; transferring container blocks that have been conveyed to the terminal-end of the outward block-support rails to the start end of the homeward block-support rails; subsequently conveying blocks at the start end of the homeward block-support rails to the terminal end of the homeward block-support rails; and thus transferring blocks that have been conveyed to the terminal end of the homeward block-support rails to the start-end of the outward block-support rails. Inconsequence, the present inventors have confirmed that containers can be accurately transported without using endless chains and that positioning displacement is not created with time, and thus completed the present invention.

More specifically, the present invention relates to (1) a chainless container-transporting device for transporting square-cylindrical containers by holding them with container holders formed between container-transporting means arranged to face parallel with each other, wherein the container-transporting means is equipped with: a number of blocks having a holding part constituting a part of the container holders; an outward block-support member and a homeward block-support member, arranged by extending in the conveying direction, for supporting the number of blocks in a movable condition along the conveying direction; a first transfer means provided between the terminal end of the outward block-support member and the start end of the homeward block-support member, capable of sequentially transferring the blocks that have been conveyed while being supported by the outward block-support member, to the homeward block-support member; a second transfer means provided between the terminal end of the homeward block-support member and the start end of the outward block-support member, capable of sequentially transferring the blocks that have been conveyed while being supported by the homeward block-support member to the outward block-support member; and a block delivering means capable of delivering and conveying blocks so that each block can circulate in the order of outward block-support member, first transfer means, homeward block-support member, second transfer means and outward block-support member.

The present invention also relates to (2) the chainless container-transporting device according to (1), wherein the block-delivering means is so constructed that it can deliver one or more blocks to the downstream side of the conveying direction, and that an adjacent block can be sequentially conveyed by the block being delivered, to the downstream side of the conveying direction; (3) the chainless container-transporting device according to (1) and (2), wherein the block-delivering means is so constructed that it can intermittently deliver and convey one or more blocks by a given pitch, to the downstream side of the conveying direction; (4) the chainless container-transporting device according to any one of (1) to (3), wherein the block-delivering means is so constructed that it can deliver blocks supported by the outward block-support member and/or homeward block-support member to the downstream side of the conveying direction; (5) the chainless container-transporting device according to any one of (1) to (4), wherein two or more block-delivering means are provided; (6) the chainless container-transporting device according to any one of (1) to (5), wherein the block-delivering means is equipped with a drive shaft and a pair of discs or a column having on its circumferential surface convex parts or concave parts capable of engaging with and delivering the blocks to the downstream side of the conveying direction; (7) the chainless container-transporting device according to (6), wherein the block is equipped with a rotatable rod-shaped member which gears into the concave parts formed on the outer circumferential surface of the pair of discs or the column; (8) the chainless container-transporting device according to any one of (1) to (5), wherein the block-delivering means is equipped with a block engaging-and-pushing member which moves forward and backward by a given stroke, capable of delivering one or more blocks while engaging therewith to the downstream side of the conveying direction; (9) the chainless container-transporting device according to any one of (1) to (8), wherein the outward block-support member and the homeward block-support member are two respective guide rails disposed above and beneath the block; (10) the chainless container-transporting device according to (9), wherein the guide rails are rod-shaped guide rails having a circular or polygonal cross-section; (11) the chainless container-transporting device according to (9) or (10), wherein the portion supporting the blocks delivered by the block-delivering means of the guide rails has a rectangular cross-section; (12) the chainless container-transporting device according to any one of (9) to (11), wherein the portion other than the portion supporting the block delivered by the block-delivering means of the guide rails has a circular cross-section; (13) the chainless container-transporting device according to any one of (9) to (12), wherein the guide rail has a roller for reducing the slide-friction factor at a part in contact with the block; and (14) the chainless container-transporting device according to (13), wherein the roller is provided on the portion supporting blocks delivered by the block-delivering means of the guide rails.

The present invention further relates to (15) the chainless container-transporting device according to any one of (1) to (14), wherein the first transfer means and/or the second transfer means are equipped with a pair of discs or a column having on its circumferential surface concave parts or convex parts capable of guiding and transferring the block while engaging therewith; (16) the chainless container-transporting device according to any one of (1) to (15), wherein the first transfer means and/or the second transfer means are equipped with a U-shaped connection block-support member connected to the outward block-support member or the homeward block-support member; (17) the chainless container-transporting device according to (16), wherein the connection block-support member is a connection guide rail having a rectangular cross-section; (18) the chainless container-transporting device according to (16) or (17), wherein the connection block-support member has a roller for reducing the slide-friction factor at a part in contact with the block; (19) the chainless container-transporting device according to (18), wherein the roller is provided on a linear part near a bent part of the U-shaped connection block-support member; (20) the chainless container-transporting device according to (19), wherein the roller provided on both the linear parts flanking the bent part of the U-shaped connection block-support member, is provided in a larger number on the downstream-side linear part compared to the upstream-side linear part; (21) the chainless container-transporting device according to any one of (1) to (20), wherein the first transfer means and/or the second transfer means have a U-shaped guide member for supporting the blocks from the inner side and/or outer side of the blocks; (22) the chainless container-transporting device according to any one of (1) to (21), wherein the container holder is constituted by a holding part for holding at least two opposing angular corners of a square-cylindrical container; (23) the chainless container-transporting device according to any one of (1) to (22), wherein the adjacent blocks are connected with a permanent magnet; (24) the chainless container-transporting device according to any one of (1) to (23) which is equipped with a container-support member situated on the lower side of the transported container, for providing a bottom support for the container; (25) the chainless container-transporting device according to any one of (1) to (24), wherein an upwardly and downwardly penetrating opening is formed at a given position of the container-support member, and a container lifting-and-lowering means is equipped, which means being capable of inserting through the opening a container lifting-and-lowering member for pushing up the container from the bottom part to the upper side and for lowering it to its original position; and (26) the chainless container-transporting device according to any one of (1) to (25), wherein the device is constructed to be equipped on a filling-and-packaging machine for filling and packaging content in the container.

EXPLANATION OF LETTERS OR NUMERALS 30. chainless container-transporting device
32. container-transporting means
33. container-transporting means
34. container holder
36. square-cylindrical container
38. holding piece
40. block
42. outward guide rail
44. homeward guide rail
46. first sprocket
48. second sprocket
50. block-delivering sprocket
51. rod-shaped support member
52. outer surface
54. guide-rail engagement member
54a. inner portion
56. guide-rail engagement member
56a. inner portion
57. abutting part
58. rod-shaped member
59. abutting part
60. connection guide rail
62. concave part
64. driven shaft
66. roller
68. concave part
70. drive shaft
72. outward guide rail
74. homeward guide rail
76. block
78. concave part
80. rod-shaped pushing member

BEST MODE OF CARRYING OUT THE INVENTION

The chainless container-transporting device of the present invention can be used while being equipped, for example, on a filling-and-packaging machine for filling and packaging content in a container held by a container holder, or on a sterilizer for sterilizing a container and the like. The chainless container-transporting device of the present invention is not particularly limited, provided that it is a chainless container-transporting device for transporting square-cylindrical containers by holding them with a container holder formed between container-transporting means arranged to face parallel with each other, wherein the container transporting means is equipped with: a number of blocks having a holding part constituting a part of the container holder; an outward block-support member and a homeward block-support member, arranged by extending in the conveying direction, for supporting the number of blocks in a movable condition along the conveying direction; a first transfer means provided between the terminal end of the outward block-support member and the start end of the homeward block-support member, capable of sequentially transferring the blocks that have been conveyed while being supported by the outward block-support member to the homeward block-support member; a second transfer means provided between the terminal end of the homeward block-support member and the start end of the outward block-support member, capable of sequentially transferring the blocks that have been conveyed while being supported by the homeward block-support member to the outward block-support member; and a block-delivering means capable of delivering and conveying blocks so that each block can circulate in the order of outward block-support member, first transfer means, homeward block-support member, second transfer means, and outward block-support member . . . . The term "chainless" used herein for the chainless container-transporting device of the present invention means that endless chains are not used for transporting a number of blocks supported by block-support members.

According to the chainless container-transporting device of the present invention, the stop-position displacement of container holders generated from chain elongations and chain structure can be prevented, and for example, the tasks of container supplying, content feeding, sealing and the like can be performed precisely, effectively, and stably. It also eliminates the necessity for the maintenance required upon chain elongation. Further, the container-transporting means can be designed and manufactured without estimating chain elongations, which eliminates the necessity for the mechanism that is responsive to elongations, and thus achieves simpler mechanism, permitting manufacturing of low-cost and clean (be efficiently cleaned) container-transporting means. Further, it eliminates the necessity for chain lubricant (mainly water for food related machines) that was essential for chains conventionally, and thus achieves functional improvement in the aspect of hygiene, because water was potentially hazardous in that its droplet could be mixed in the container resulting in a bacterial contamination. Furthermore, conventionally, wear was created on chains due to contact of the gear edge (lateral face) of sprockets with roller-link plate of chains, and abrasion powder was inevitably generated on the area under high surface pressure. According to the chainless container-transporting device of the present invention, drive sections can be decentralized, which decreases surface pressure and thus prevents generation of abrasion powder.

The block in the chainless container-transporting device of the present invention is not particularly limited, provided that it has a holding part constituting a part of the container holder. Examples of the holding part include, for example, a concave part so formed as to support one angular corner or two angular corners of a container, and a platy holding part having an L-shaped, channel-shaped, or U-shaped cross-section, that supports one angular corner or two angular corners of the container. When one holding piece having an L-shaped cross-section is provided on one block, the four angular corners of a square-cylindrical container are held by the four holding pieces provided on two blocks of the container-transporting means on one side, and on two blocks of the container-transporting means on the other side. Still further, a square-cylindrical container is a carton with a bottom, made of a carton blank which is unfolded into a square-cylindrical shape and sealed at the bottom. It has been known that a carton with a bottom unfolded into a square-cylindrical shape exhibits a diamond-shape (rhomboid) in cross-section in the natural state due to force trying to restore the original state of the folded carton blank (buckling; diamond transformation), and that the rate of buckling increases proportionally according to the stiffness of the paper. Container holders for such square-cylindrical containers can be constituted by holding parts (holding pieces) for holding the opposing angular corners (acute-angular part) of the square-cylindrical containers.

The shape or size of the block can be determined as desired, which include, for example, a block of about 30 mm-65 mm long in the conveying direction. Further, its material is not particularly limited although abrasion-resistant materials with a low slide-friction factor between the above outward block-support member and the homeward block-support member (also referred to as block-support members if it meant to represent both) is preferable, specific examples including hard plastics, stainless-steel alloys, and aluminum alloys. The block can also be provided with a roller at an area in contact with the block-support member in order to reduce the slide-friction factor between the block and the block-support member.

This block is preferably provided with a delivering-engagement part which engages with block-delivering means. Examples of such delivering-engagement parts include one or more concave parts or openings which engage with the convex part of the block-delivering means, and one or more convex parts or rod-shaped members which engage with the concave parts or openings of the block-delivering means, which facilitates and ensures the delivering of blocks. Particularly, when using a pair of discs or a column having on its circumferential surface the concave parts capable of engaging with and delivering the blocks to the downstream side of the conveying direction, the delivering-engagement part can be a fixed rod-shaped member or convex part, although a rotatable rod-shaped member which gears into the concave parts formed on the circumferential surface of the pair of discs or the column is preferable for achieving smooth block delivering and for reducing load on the pair of discs or the column and the rod-shaped member. Further, when using the pair of discs or the column such as those described above as a block-delivering means, it is preferable that a block is provided with two or more delivering-engagement parts for achieving more stable delivering and for reducing radii of the pair of discs or the column, and it is most preferable that they are provided at two places from the standpoint of component-designing and processing. Still further, a preferred block has a support-member-engagement part which engages with a block-support member, examples of such support-member-engagement parts including a U-shaped or channel-shaped engagement part which supports by accommodating the rod-shaped support member. A number of these blocks are preferably connected with the adjacent blocks with permanent magnets, by which stable block conveyance is achieved.

The above outward block-support member and homeward block-support member are not particularly limited provided that they are support-members arranged by extending in the conveying direction, which support a number of blocks in a movable condition along the conveying direction, and at least the outward block-support members are arranged by extending along the container conveying direction. This block-support members are preferably constituted by two guide rails disposed above and beneath the block respectively, and specific examples of such guide rails include rod-shaped guide rails having a circular (including oval hereinafter) or polygonal cross-section, or grooved guide rails comprising a member having a U-shaped or channel-shaped cross-section. In the case of a rod-shaped guide rail, it is preferable that the portion supporting the block delivered by the block-delivering means has a rectangular cross-section, and that the portion other than the portion for supporting the blocks delivered by the block-delivering means has a circular cross-section. In this case, a great force is applied to the portion supporting the block delivered by the block-delivering means, making the blocks unstable. However, by making such a section rectangular in cross-section, the blocks can be conveyed more stably. Further, by making the portion other than the portion supporting the block delivered by the block-delivering means circular in cross-section, the rod-shaped guide rail will be in line contact with the channel-shaped or U-shaped support-member-engagement portion, and thus the contact abrasion can be reduced. Moreover, the broadened cleaning space gives the portion increased cleaning efficiency.

At the contact area of the guide rail and a block, a roller can be provided for reducing the slide-friction factor to achieve smooth block delivering and conveyance. This roller is preferably provided at a specific section for supporting the block delivered by the block-delivering means of the guide rail. In this case, a great load is applied to the block delivered by the block-delivering means and the guide rail as well as the block conveyance is not conducted smoothly compared to other portion, but this problem can be overcome by providing the roller.

The length of a block-support member can be selected as desired. However, the preferred outward block-support member and homeward block support member are long enough to support container holders between the starting end of the conveying direction (upstream end) and the terminal end of the conveying direction (downstream end), or between the first delivering means and the second delivering means. Further, the material of the block-support member is not particularly limited, although abrasion-resistant materials with a small slide-friction factor are preferable, specific examples including hard plastics, alloys of stainless steel, and hard plastics-coated stainless steel, of which, stainless steel coated with high-density polyethylene (HDPE) is preferable to use.

The above block-delivering means is not particularly limited in terms of movement/mechanism or the setting position, provided that it is capable of delivering and conveying a number of blocks intermittently and/or continuously so that each block can circulate in the order of outward block-support member, first transfer means, homeward block-support member, second transfer means, and outward support member . . . . Preferred examples includes: a block-delivering means so constructed that it delivers one or more blocks to the downstream side of the conveying direction, and by such delivered blocks, the adjacent block is sequentially conveyed to the downstream side of the conveying direction; and a block-delivering means so constructed that it can intermittently deliver and convey one or more blocks by a given pitch to the downstream side of the conveying direction. This block-delivering means is preferably constructed so that it can deliver the block supported by the outward block-support member and/or homeward block-support member (blocks on the linear part), and in this case, block-delivering means can be provided in plural numbers, thus it is possible to manufacture very long conveyors with an unlimited conveyor length which save us the annoying problem of chain elongations. Furthermore, by delivering the blocks on the linear part, the V of the so called PV value (P: surface pressure; V: slide velocity) or the abrasion-deciding value, becomes approximately zero, which suggests no rubbing is caused between the blocks. Thus the abrasion of blocks does not occur, which ensures the prevention of block-size change.

More specific examples of the above block-delivering means include: a block-delivering means equipped with a drive shaft and a pair of discs or a column having on its circumferential surface concave part or convex part capable of engaging with and delivering blocks to the downstream side of the conveying direction (a sprocket-system delivering means); and a block-delivering means equipped with a block engaging-and-pushing member which advances or retreats by a given stroke and is capable of delivering one or more blocks while engaging therewith, to the downstream side of the conveying direction.

The sprocket-system delivering means is equipped with a drive shaft and a pair of discs or a column having on its circumferential surface concave parts or convex parts, and is so constructed that it delivers the blocks by rotating the drive shaft with the above concave or convex parts geared into the concave part or a rod-shaped member, or into a concave part or an opening formed on the block. According to this sprocket-system delivering means, container holders can be continuously delivered and conveyed by continuously rotating the drive shaft of the pair of discs or the column, and the container holders can be intermittently delivered and conveyed by a given pitch by intermittently rotating the drive shaft of the above pair of discs or the column. Meanwhile, the sprocket-system delivering means which is provided at the starting end or the terminal end of the block support member can be also used as a first and/or a second transfer means which will be described later.

Examples of block engaging-and-pushing members include: one or more rod-shaped pushing members with a circular or rectangular cross-section, having a convex part (engaging-and-pushing convex part) engaging with a concave part or opening formed on the block; and one or more rod-shaped pushing members with a circular or rectangular cross-section, having a concave part or opening (an engaging-and-pushing concave part or an engaging-and-pushing opening) engaging with the convex part or a rod-shaped member of the block. For moving forward and backward the block engaging-and-pushing member along the conveying direction, a fluid cylinder such as air cylinder or a servo motor and the like can be used. The above given stroke can be one, two, three pitches or the like, and preferably one or two pitches, when the block length in the conveying direction is defined as one pitch. According to the type of block-delivering means which moves this block engaging-and-pushing means forward and backward by a given stroke, one or more blocks are delivered to the downstream side of the conveying direction, and the delivered container holder can intermittently deliver and convey sequentially a plurality of blocks situated adjacent to each other by a given pitch, and the filling is conducted during the stop time. Further, it is possible to provide the holder engaging-and-pushing member arranged by extending along almost the full length of the block-support member in the conveying direction, with a convex part or concave part, or an opening which corresponds to a concave part or an opening, or a convex part or a rod-shaped member on almost all the blocks supported by the block-support member, and in this case, almost all the blocks supported by the block-support member can be delivered and conveyed together intermittently by a given pitch to the downstream side of the conveying direction without close contact between the container holders.

As for the type of block-delivering means which delivers and conveys intermittently by a given pitch a block with its concave part or opening being engaged with the engaging-and-pushing convex part provided on the block-engaging-and-pushing member, examples of the specific embodiments includes: a ratchet click system that delivers blocks by repeating a simple reciprocating movement, wherein a block is delivered by a given pitch after being advanced by a given stroke with the concave part or opening formed on the block engaged with the engaging-and-pushing convex part of the ratchet click and the like, and subsequently, when the block engaging-and-pushing member starts to move backward by a given stroke, the engagement of engaging-and-pushing convex part of the ratchet click and the like provided on the block engaging-and-pushing member with the concave part or an opening formed on the block is released, and the block is advanced by a given pitch as a result; a turn-click system that delivers blocks by repeating a reciprocating forward-and-reverse turning movement, wherein a block is delivered by a given pitch after being advanced by a given stroke with the concave part or opening formed on the block engaged with engaging-and-pushing convex part, and subsequently, the disengaged condition is made by rotating axially the block engaging-and-pushing member, and after moving backward the block by a given stroke in this disengaged condition, the engagement is made again by turning it reversely; and a box-motion click system that delivers blocks by repeating box movement, wherein a block is delivered by a given pitch after being advanced by a given stroke with the concave part or opening formed on the block engaged with the engaging-and-pushing convex part, and subsequently a disengaged condition is made by moving the block engaging-and-pushing member in the perpendicular direction to the block, and after moving backward the block by a given stroke in this disengaged condition, the engagement is made again by returning the block engaging-and-pushing member to its original position.

The first transfer means and/or the second transfer means of the chainless container-transporting device of the present invention is not particularly limited provided it is a transfer means capable of guiding the blocks that have been conveyed while being supported by the block-support members to the other block-support members, and is preferably equipped with a (reciprocal/revolution) drive source to suit the need.

Specific examples of the first transfer means and/or the second transfer means include a sprocket-system transfer means equipped with a pair of discs or a column having on its circumferential surface a concave part or convex part capable of guiding and transferring the blocks while being engaged therewith. The sprocket-system transfer means may be equipped with a drive source. The pair of discs or the column is adapted to convey and transfer container holders by rotating with its concave part or convex part being geared into the concave part or convex part provided on the block.

Further, examples of the first transfer means and/or the second transfer means include a guide-system transfer means equipped with a U-shaped connection block-support member connected to the outward block-support member and the homeward block-support member. The guide-system support member can be used independently, while more stable transfer of the block to other block-support member is achieved when used in combination with the above sprocket-system transfer means.

Examples of the above U-shaped connection block-support members include connection guide rails having circular or polygonal cross-section, and because a great force is applied to such a portion, a connection guide rails having a rectangular cross-section to provide a surface contact is preferable. Particularly, in the case of a surface contact, it is preferable to provide a roller on a part in contact with a block, to reduce the slide-friction factor so that the blocks can be conveyed smoothly. This roller can be provided on the part or whole of the connection block-support member, and particularly because the blocks are not conveyed smoothly along the linear part near the bent part of the U-shaped connection block-support member, it is particularly preferable that this section is provided with a roller. When providing a roller on both the linear parts flanking the bent part of the U-shaped connection block-support member, it is preferable to provide more rollers on the downstream-side linear part compared to the upstream-side linear part. Because of jammed-up blocks on the downstream-side linear part, a great load is applied to the blocks and the connection support-block as compared to the upstream-side linear part, while in this case this problem will be solved and the further the abrasion of the abutted part (edge part) which pushes out the adjacent block is inhibited.

Also, a preferred first transfer means and/or second transfer means have a U-shaped guide member to support the block from the inner side and/or the outer side (lateral faces) as well as the above pair of discs or column and the U-shaped connection guide rails. By means of this, blocks can be better prevented from wobbling and thus can be conveyed more smoothly. Further, it may be a U-shaped guide member that support the blocks having a bottom from the inner side and/or outer side. In this case, it can be used independently.

The chainless container-transporting device of the present invention can be so constructed as to support the container bottom by a holding part of a block, while it is preferable to be equipped with a container-support member supporting the bottom of the container, situated on the lower side of the containers being transported, because it reduces the load applied on the block, block-support member or the like. This container-support member is not particularly limited in terms of shape and the like, while a rod-shaped member with a smooth top arranged by extending in the conveying direction of the containers is preferable. Examples include a rod-shaped support member having a rectangular or inverted triangular cross-section, while a rod-shaped member having a rectangular cross-section is preferable. At the given position of the container-support member, it is preferable that an opening penetrating both upwardly and downwardly is formed, and also that a container lifting-and-lowering means is equipped, which means being capable of inserting the container lifting-and-lowering member through the opening, pushing the container up from the bottom and then lowering it to its original position. The given position is, for example a position where a filling device is set when the chainless container-transport device of the present invention is equipped on a filling-and-packaging machine. When the container pushed up by the container lifting-and-lowering means reaches the top dead center, the filling nozzle starts filling the descending container with liquid until the head of the filling nozzle is withdrawn from the descended container, and the container-transporting starts almost at the same time as the filling is completed. Thus, by using the container lifting-and-lowering means for pushing up the container from the bottom and for lowering it to its original position by inserting the container lifting-and-lowering member through the upwardly and downwardly penetrating opening formed at a given position of the container-support member, container lifting-and-lowering can be carried out smoothly without applying load to each member (for example, blocks) of the container-transporting means. Further, in this case, a container-transporting means with simpler structure is achieved because each member (for example, blocks) of the container lifting-and-lowering member does not have to go up and down according to the lifting and lowering of the container, and as a result, creation of flaws can be avoided in the container-transporting means.

Figure 1:
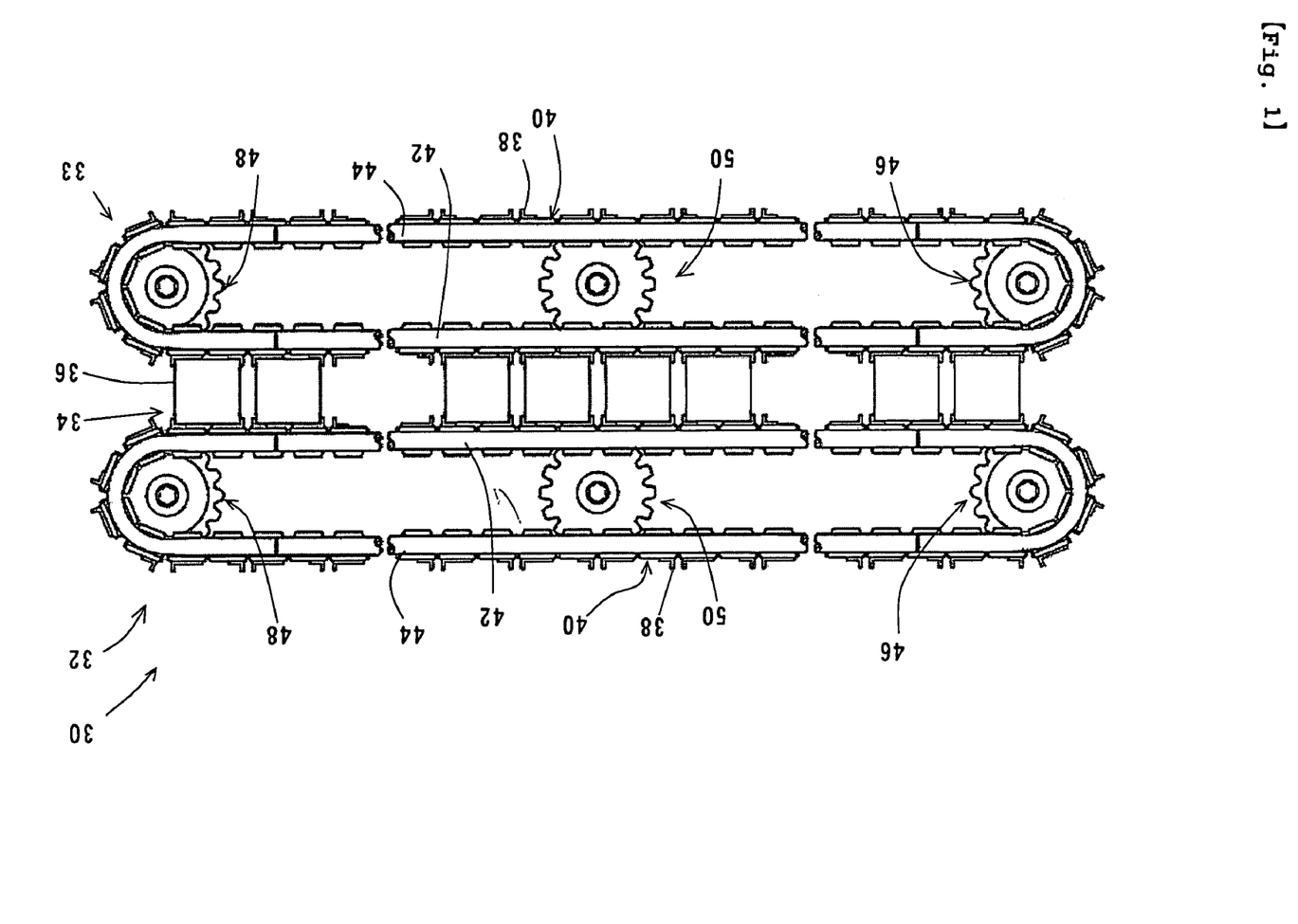
FIG. 1 is a schematic plan view of the chainless container-transporting device according to one of the embodiments of the present invention.
Figure 2:
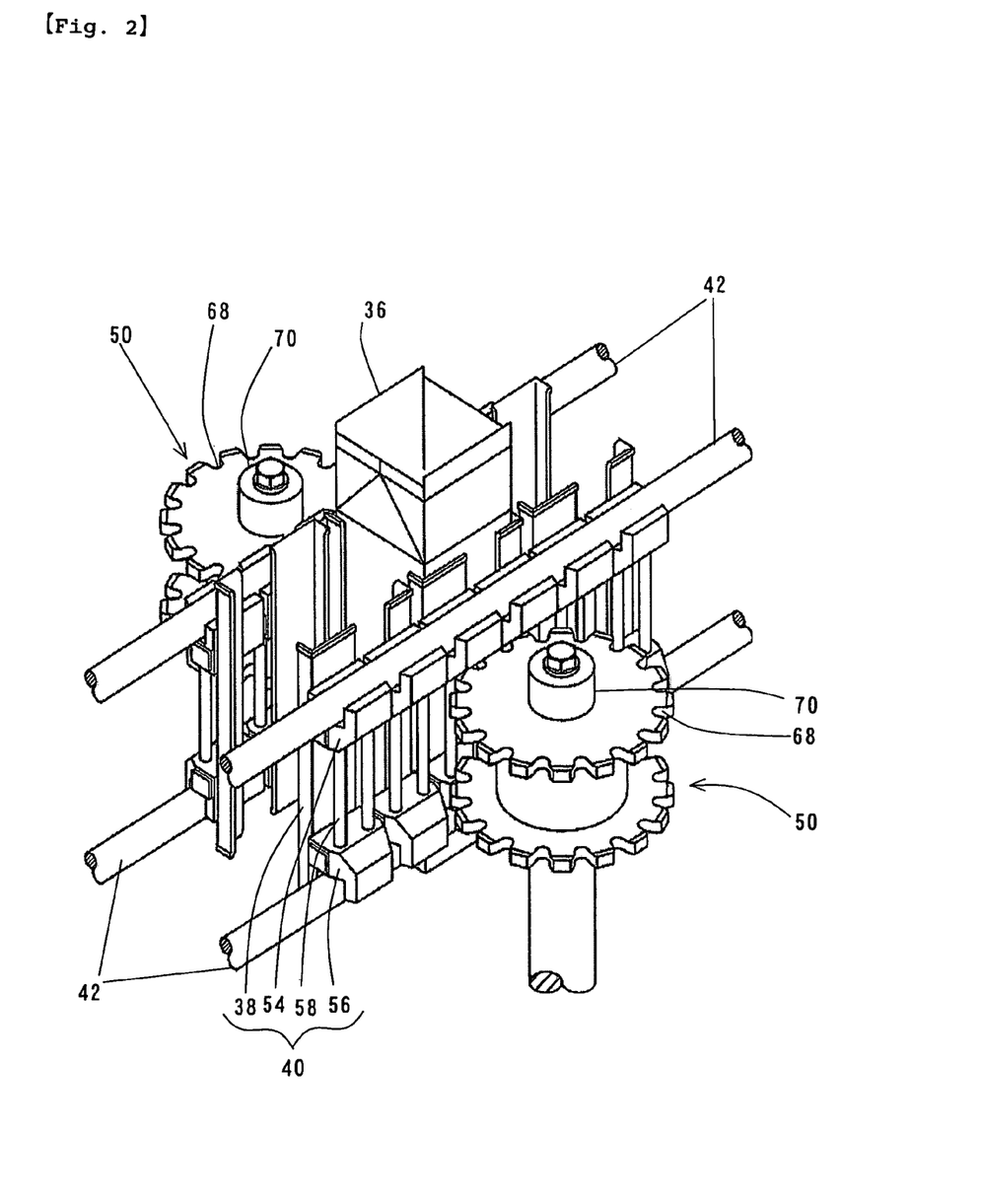
FIG. 2 is a perspective view of the area around the block-delivering means of the chainless container-transporting device of FIG. 1.
Figure 3:
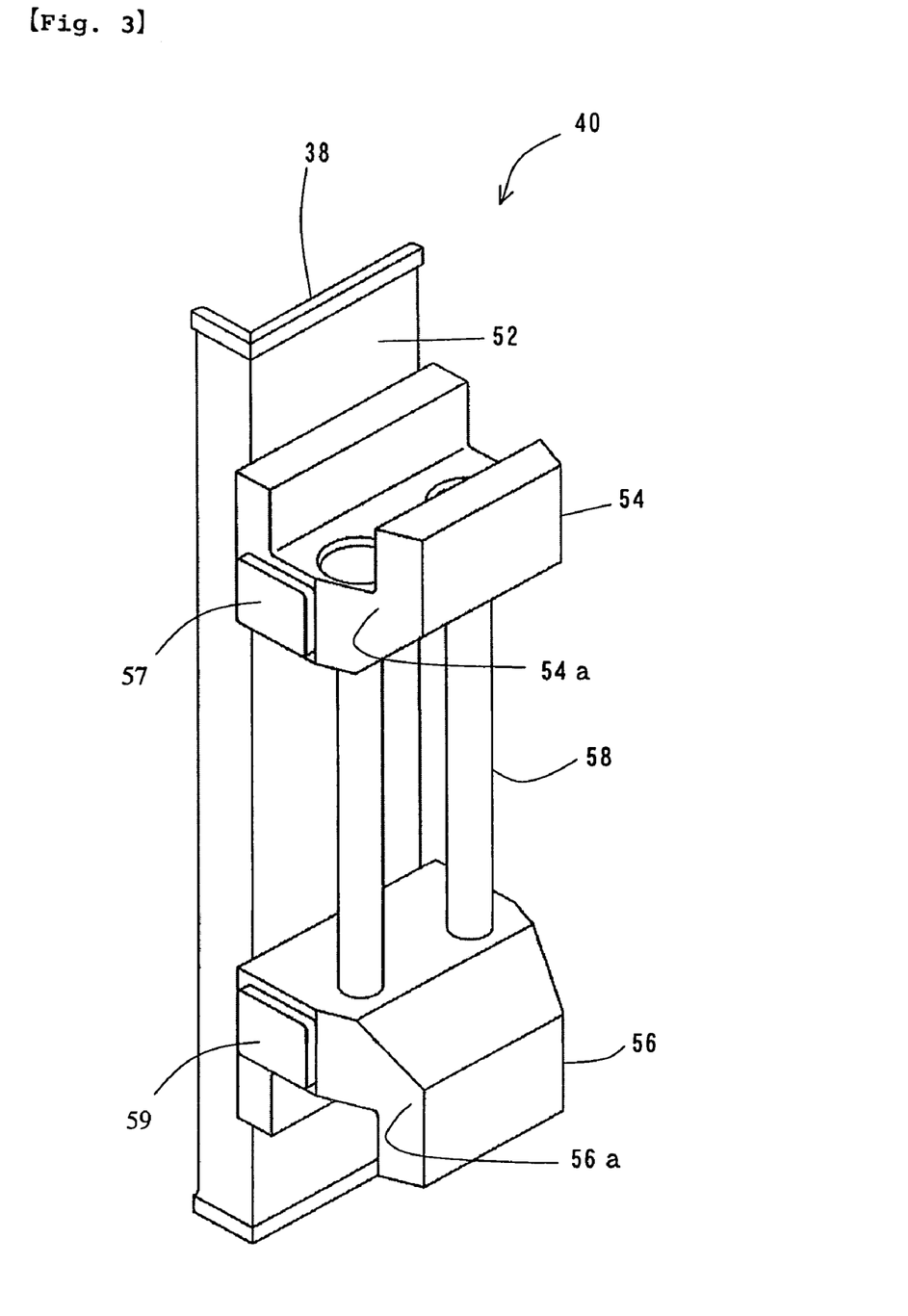
FIG. 3 is a perspective view of the block of the chainless container-transporting device of FIG. 1.
Figure 4:
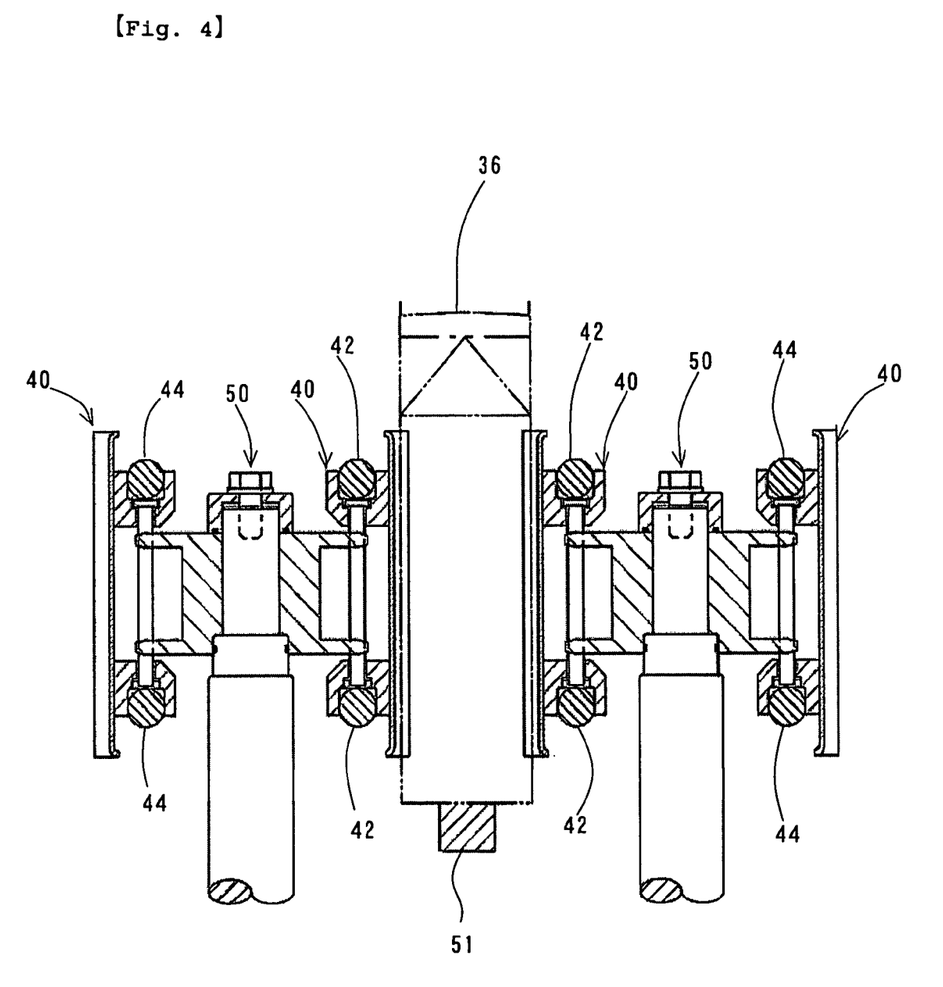
FIG. 4 is a cross-sectional view of the area around the block-delivering means of the chainless container-transporting device of FIG. 1.
Figure 5:
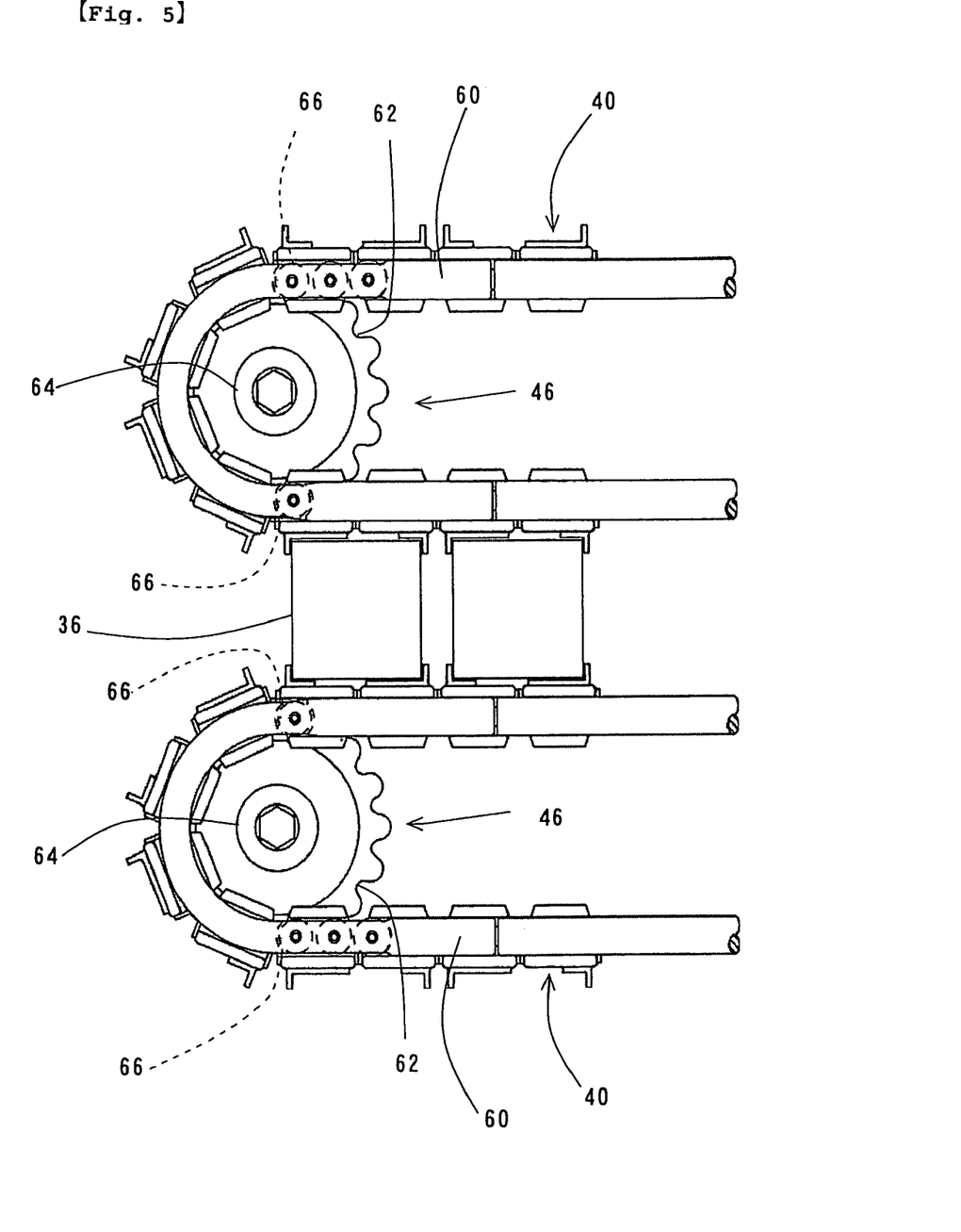
FIG. 5 is a plan view of the area around the first transfer means of the chainless container-transporting device of FIG. 1.
Figure 6:
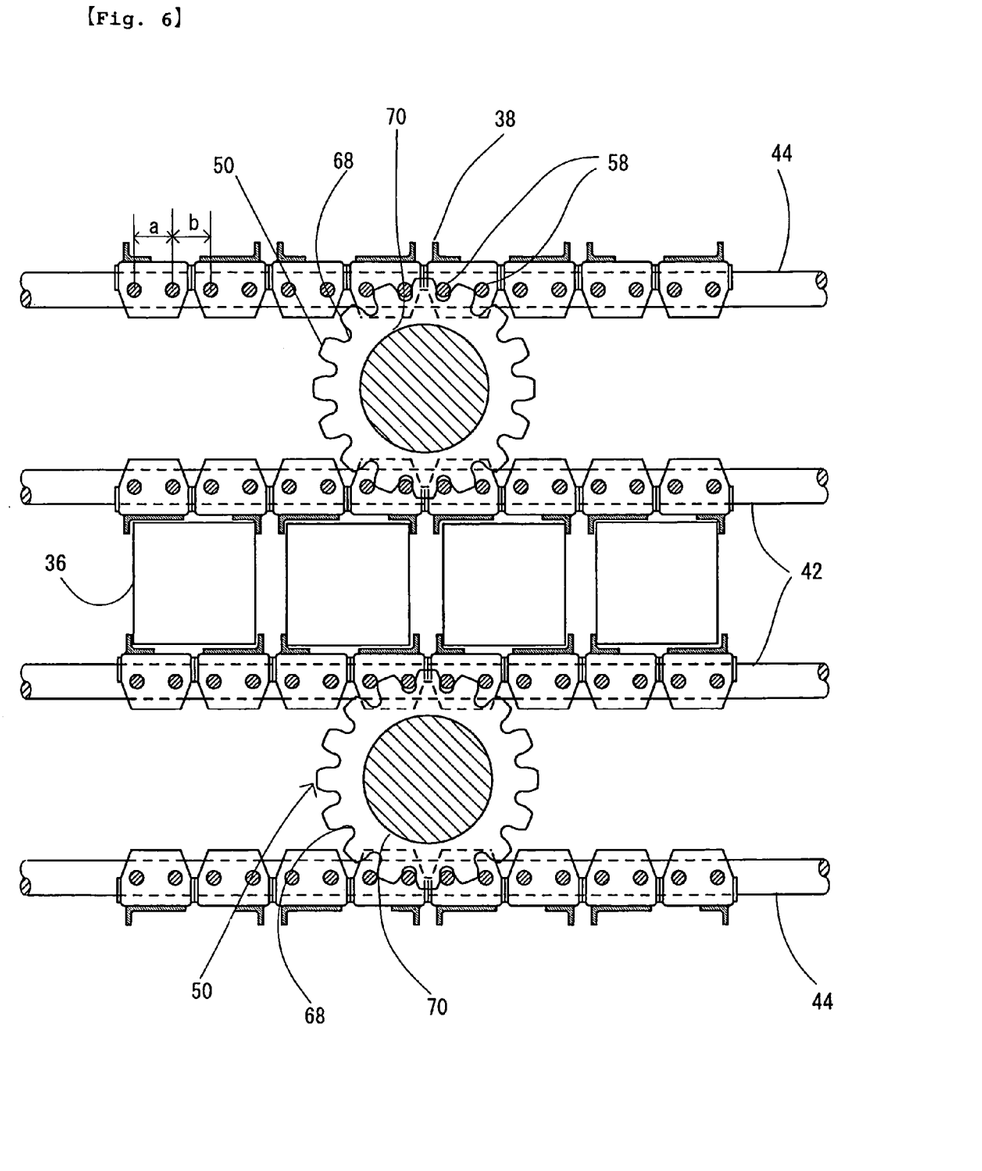
FIG. 6 is a cross-sectional view of the area around the block-delivering means of the chainless container-transporting device of FIG. 1.
Figure 7:
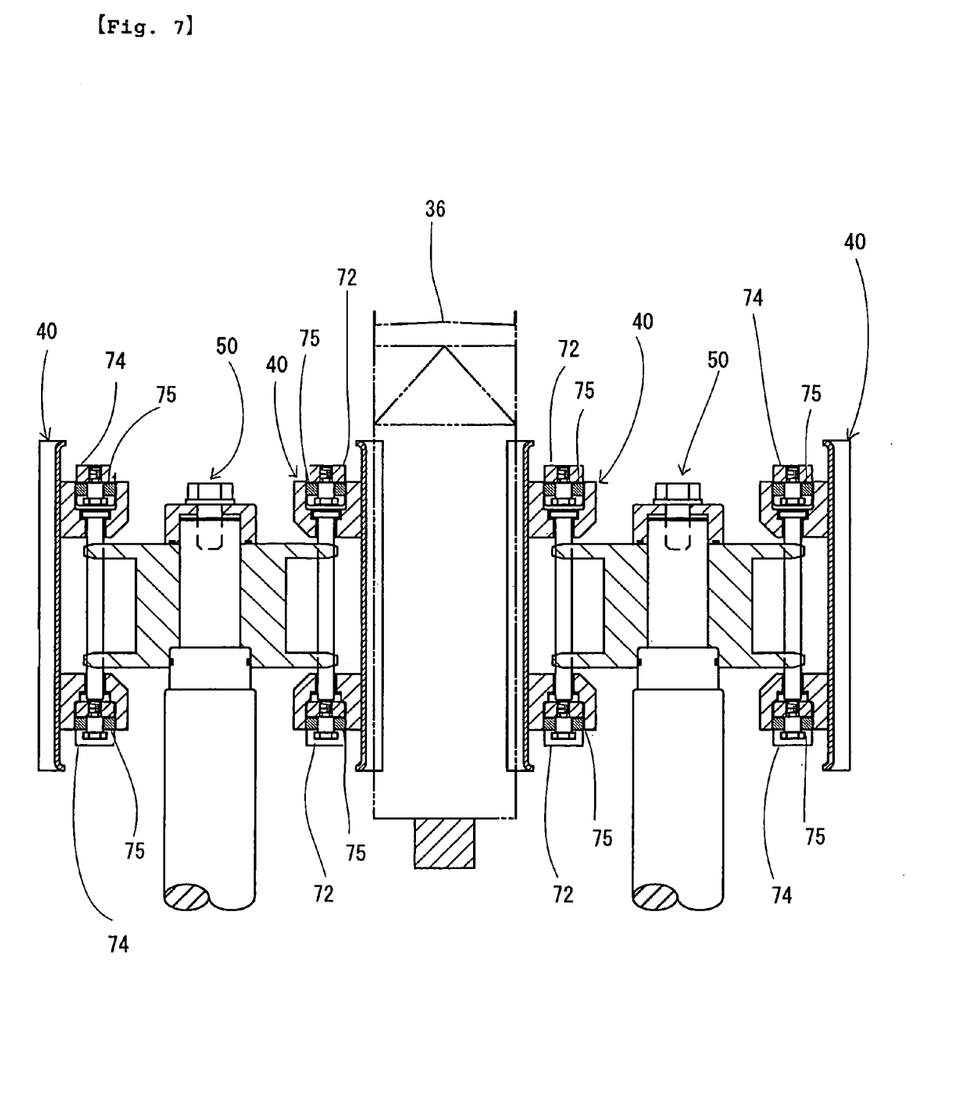
FIG. 7 is a longitudinal sectional view of the area around the block-delivering means according to a modified example of the chainless container-transporting device of FIG. 1.
Figure 8:
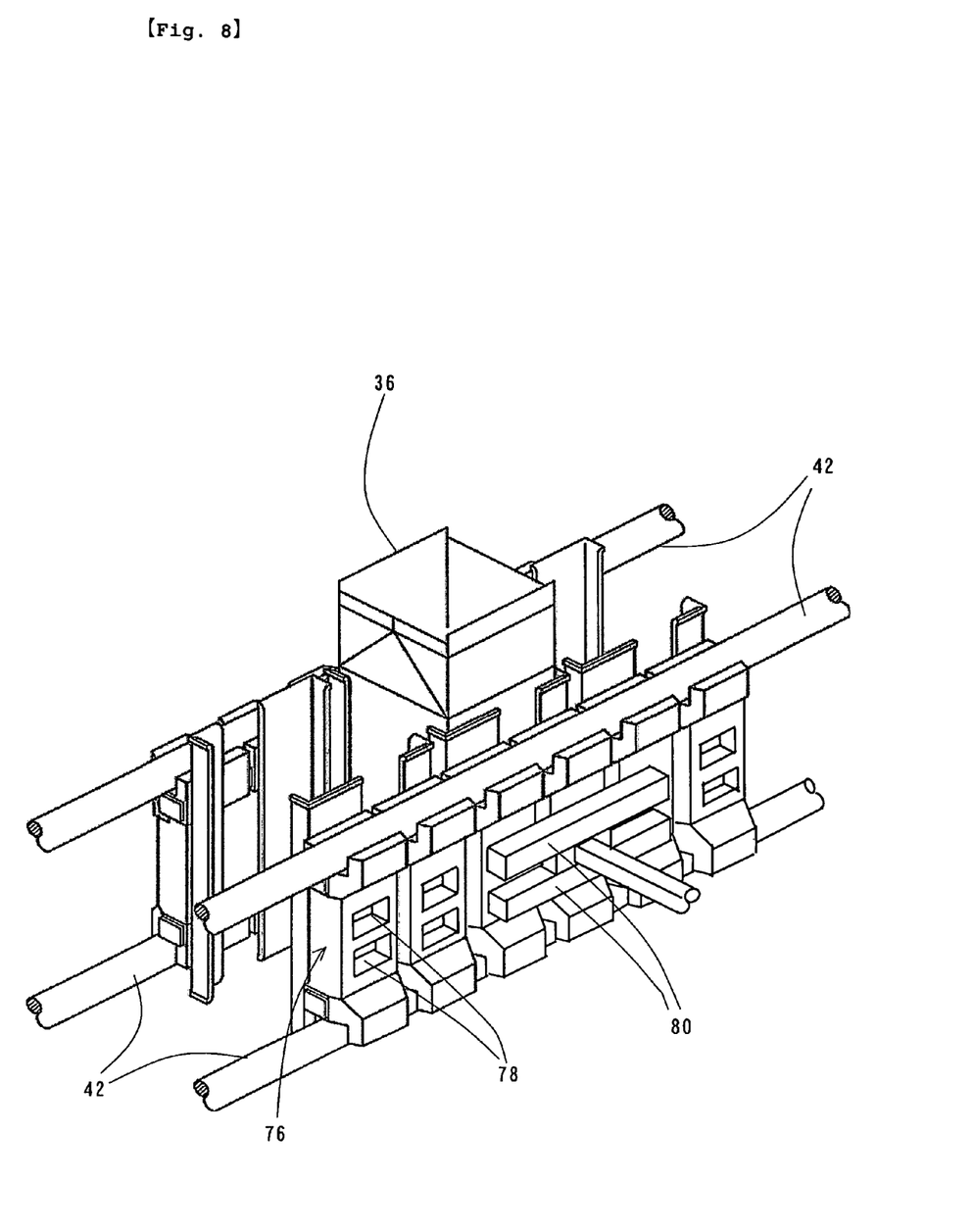
FIG. 8 is a perspective view of the area around the block-delivering means according to another modified example of the chainless container-transporting device of FIG. 1.

The chainless container-transporting device of the present invention will be described in detail with reference to the drawings. FIG. 1 is a schematic plan view of the chainless container-transporting device according to one of the embodiments of the present invention. FIG. 2 is a perspective view of the area around the block-delivering means of the chainless container-transporting device of FIG. 1. FIG. 3 is a perspective view of a block of the chainless container-transporting device of FIG. 1. FIG. 4 is a cross-sectional view of the area around the block-delivering means of the chainless container-transporting device of FIG. 1. FIG. 5 is a plan view of the area around the first transfer means of the chainless container-transporting device of FIG. 1. FIG. 6 is a cross-sectional view of the area around the block-delivering means of the chainless container-transporting device of FIG. 1. FIG. 7 is a longitudinal sectional view of the area around the block-delivering means according to a modified example of the chainless container-transporting device of FIG. 1. FIG. 8 is a perspective view of the area around the block-delivering means according to another modified example of the chainless container-transporting device of FIG. 1.

As shown in FIGS. 1 to 6, the chainless container-transporting device 30 according to one embodiment of the present invention is a container-transporting device for holding and transporting a square-cylindrical container 36 with a container holder 34 formed between a container-transporting means 32 and 33 arranged to face parallel with each other, wherein the container-transporting means 32 and 33 are equipped with: a number of blocks 40 having a holding piece 38 which is an example of a holing part constituting a part of the container holder 34; an outward guide rail 42 and an homeward guide rail 44, arranged by extending in the conveying direction, for supporting the number of blocks 40 in a movable condition along the conveying direction; a first sprocket 46 provided between the terminal end of the outward guide rail 42 and the start-end of the homeward guide rail 44, constituting a first transfer means capable of sequentially transferring blocks 40 that have been conveyed while being supported by the outward guide rail 42 to the homeward guide rail 44; a second sprocket 48 provided between the terminal end of the homeward guide rail 44 and the start-end of the outward guide rail 42, constituting a second transfer means capable of sequentially transferring blocks 40 that have been conveyed while being supported by the homeward guide rail 44 to the outward guide rail 42; a block-delivering sprocket 50 which is an example of a block delivering means capable of delivering and conveying blocks 40 so that each block 40 can circulate in the order of outward guide rail 42, first transfer means 46, homeward guide rail 44, second transfer means 48 and outward guide rail 42 . . . ; and a rod-shaped support member 51 (see FIG. 4) having a rectangular cross-section arranged by extending in the container-transporting direction, which is an example of a container-support member for supporting the bottom of the square cylindrical container 36 in a transportable condition, situated in the lower side of a square-cylindrical container 36 supported by the container holders 34.

As shown in FIG. 3, block 40 is equipped with a platy holding piece having an L-shaped cross-section 38; guide-rail-engagement members 54 and 56 with openings having a channel-shaped cross-section each facing upward and downward, fixed at the upper part and at the lower part onto the outer surface 52 of the holding piece 38; and two rod-shaped members 58 so fixed that they connect guide rail engagement members 54 and 56. On the lateral side of the guide-rail engagement members 54 and 56, abutting parts 57 and 59 are provided where blocks 40 abut with each other. The contact parts 57 and 59 are provided outside the line joining the centers of rod-shaped members 58 (the side of holding-piece 38), and, as shown in FIG. 5, are so adapted that the adjacent abutting parts 57 and 58 do not intervene with each other when moving from the linear part to the bent part of transfer means 46 (48). Further, inner sections 54a and 56a, wherein abutting parts 57 and 59 of the lateral sides of guide-rail engagement members 54 and 56 are not provided, are chamfered, and are adapted to avoid intervening with adjacent block 40 when passing the transfer means 46 (48). Furthermore, rod-shaped members 58 are so arranged that the space between all the rod-shaped members 58 are the same in the condition where they are supported by guide rails 42 and 44, and blocks 40 are abutting with each other (in a straight lined-up condition). More specifically, as shown in FIG. 6, the rod-shaped members are so arranged that space (a) between rod-shaped members 58 arranged on a block 40 and space (b) between rod members 58 of the adjacent blocks 40 are the same; and the blocks 40 are so constructed that their width is twice as long as the space between the rod-shaped members 58. In the present embodiment, container holder 34 is constituted by four holding pieces 38.

Moreover, guide-rail-engagement members 54 and 56 accommodate guide rails 42 and 44 slidably in the concave part. Rod-shaped members 58 are fitted in a rotatable condition to guide-rail-engagement members 54 and 56, and this portion engages with the block-delivering sprocket 50 to deliver blocks 40. At this time, because rod-shaped members 58 are fitted rotatably, the load applied on rod-shaped members 58 and on block-delivering sprocket 50 is reduced and the blocks 40 can be smoothly and stably delivered.

As shown in FIGS. 2 and 4, outward guide rails 42 and homeward guide rails 44 are respectively two rod-shaped members having a circular cross-section disposed above and beneath blocks 40. Due to the circular shape of their cross-sections, the outward guide rails 42 and homeward guide rails 44 can be in line contact with the above guide-rail engagement members 54 and 56, thus giving such parts increased cleaning efficiency.

Further, as shown in FIG. 5, the first transfer means is equipped with the first sprocket 46 and a U-shaped connection guide rail 60. The first sprocket comprises upper-and-lower two-stage gears having concave parts 62 on the outer circumference for gearing with rod-shaped members 58 of blocks 40 and is equipped with a drive shaft 64. The connection guide rail 60 is a U-shaped rod-shaped member having a rectangular cross-section, which connects the outward guide rails 42 and the homeward guide rails 44, two of them being disposed one above the other respectively. On the linear part near the bent part of the U-shaped connection guide rail 60, rollers 66 are provided in order to reduce the friction between the guide-rail engagement members 54 and 56 of blocks 40. One roller 66 is provided on the upstream side and three on the downstream side. The device is in such a construction as to be provided with more rollers on the downstream side compared to the upstream side. Meanwhile, the second transfer means has the same construction as the first transfer means.

As shown in FIGS. 4 and 6, block-delivering sprocket 50 is equipped with upper-and-lower two-stage gears having on their circumferential surfaces concave parts 68 gearing with rod-shaped members 58 of blocks 40, and with a drive shaft 70 joined to a drive source which is not illustrated. The block-delivering sprocket 50 delivers a total of four blocks 40 to the downstream side of the conveying direction by gearing with rod-shaped members 58 of two blocks 40 supported by outward guide rail 42 and of two blocks 40 supported by homeward guide rail 44. By delivering the four blocks 40, adjacent blocks 40 will be sequentially conveyed to the downstream side and thus the blocks 40 as a whole are conveyed and circulated. Meanwhile, in the present embodiment, outward and homeward blocks are so constructed as to be delivered at the same time from the stand point of efficiency and cost reduction, while the blocks may be delivered outwardly and homewardly independently, and in this case, for example, it can be constructed so that the blocks on the homeward side can be delivered at once at a fast speed from the start-end side to the terminal-end side by using a linear feeder and the like.

Further, in the chainless container-transporting device 30, as shown in FIG. 7, a modified example of outward guide rail 42 and homeward guide rail 44 having circular cross-sections includes outward guide rails 72 and homeward guide rails 74 wherein the section supporting block 40 delivered by block delivering sprocket 50 has a rectangular cross-section. The outward guide rails 72 and homeward guide rails 74 are provided with rollers 75 in order to reduce friction between guide-rail engagement members 54 and 56 of block 40. In this case, a great load is applied to blocks 40 delivered by the block delivering sprocket 50 and to guide rails 72 and 74, and in addition, blocks 40 are not conveyed smoothly, but this problem can be overcome by providing a roller 75. Meanwhile, although not illustrated, the part other than the part supporting blocks 40 delivered by the block-delivering sprocket 50 of the outward guide rail 72 and the homeward guide rail 74 has a circular cross-section, thus giving such part increased cleaning efficiency.

Moreover, in the chainless container-transporting device 30, modified examples of blocks 40 and the block-delivering sprocket 50 include, as shown in FIG. 8, a combination of blocks 76 wherein a concave part 78 is formed one above the other on the center part, and two rod-shaped pushing members 80 with a rectangular cross-section having a latchet click (engagement-and-pushing concave part) which are situated one above the other in parallel and is engaging with concave parts 78 of blocks 76, respectively. The rod-shaped pushing members 80 deliver blocks by advancing by a given stroke while engaging with blocks 76 and thus delivering the block by a given pitch; and subsequently, at the start of retreating at a given stroke, the engagement of the latchet click provided on the rod-shaped members 80 with the concave part 78 formed on blocks 76 is released; and consequently blocks 76 advance by a given pitch.

INDUSTRIAL APPLICABILITY

According to the chainless container-transporting device of the present invention, because endless chains are not used for transporting the blocks supported by block-support members, the problems caused by elongations and the structure of endless chains which was inevitably created by using endless chains in the container-transporting conveyors for conventional filling-and-packaging machines, can be avoided fundamentally. Further, positional accuracy of container holders being transported to each station for container supplying, filling, lid-material sealing and the like in a filling-and-packaging machine can be precise, and thus the processes of container supplying, filling, lid-material sealing and the like can be conducted efficiently and stably.

The invention claimed is:

1. A chainless container-transporting device for transporting square-cylindrical containers by holding them with container holders formed between container-transporting means arranged to face parallel with each other, wherein the container-transporting means is equipped with:
   a number of blocks having a holding part constituting a part of the container holders of said chainless container-transporting device;
   an outward block-support member and a homeward block-support member, arranged by extending in the conveying direction, for supporting the number of blocks in a movable condition along the conveying direction;
   a first transfer means provided between the terminal end of the outward block-support member and the start end of the homeward block-support member, capable of sequentially transferring the blocks that have been conveyed while being supported by the outward block-support member to the homeward block-support member;
   a second transfer means provided between the terminal end of the homeward block-support member and the start end of the outward block-support member, capable of sequentially transferring the blocks that have been conveyed while being supported by the homeward block-support member to the outward block-support member; and
   a block delivering means capable of delivering and conveying blocks so that each block can circulate in the order of outward block-support member, first transfer means, homeward block-support member, second transfer means and outward block-support member.

2. The chainless container-transporting device according to claim 1, wherein the block-delivering means is so constructed that it can deliver one or more blocks to the downstream side of the conveying direction, and that an adjacent block can be sequentially conveyed by the block being delivered, to the downstream side of the conveying direction.

3. The chainless container-transporting device according to claim 1, wherein the block-delivering means is so constructed that it can intermittently deliver and convey one or more blocks by a given pitch, to the downstream side of the conveying direction.

4. The chainless container-transporting device according to claim 1, wherein the block-delivering means is so constructed that it can deliver blocks supported by the outward block-support member and/or homeward block-support member to the downstream side of the conveying direction.

5. The chainless container-transporting device according to claim 1, wherein two or more block-delivering means are provided.

6. The chainless container-transporting device according to claim 1, wherein the block-delivering means is equipped with a drive shaft and a pair of discs or a column having on its circumferential surface convex parts or concave parts capable of engaging with and delivering the blocks to the downstream side of the conveying direction.

7. The chainless container-transporting device according to claim 6, wherein the block is equipped with a rotatable rod-shaped member which gears into the concave parts formed on the outer circumferential surface of the pair of discs or the column.

8. The chainless container-transporting device according to claim 1, wherein the block-delivering means is equipped with a block engaging-and-pushing member which moves forward and backward by a given stroke, capable of delivering one or more blocks while engaging therewith to the downstream side of the conveying direction.

9. The chainless container-transporting device according to claim 1, wherein the outward block-support member and the homeward block-support member are two respective guide rails disposed above and beneath the block.

10. The chainless container-transporting device according to claim 9, wherein the guide rails are rod-shaped guide rails having a circular or polygonal cross-section.

11. The chainless container-transporting device according to claim 9, wherein the portion supporting the blocks delivered by the block-delivering means of the guide rails has a rectangular cross-section.

12. The chainless container-transporting device according to claim 9, wherein the portion other than the portion supporting the block delivered by the block-delivering means of the guide rails has a circular cross-section.

13. The chainless container-transporting device according to claim 9, wherein the guide rail has a roller for reducing the slide-friction factor at a part in contact with the block.

14. The chainless container-transporting device according to claim 13, wherein the roller is provided on the portion supporting blocks delivered by the block-delivering means of the guide rails.

15. The chainless container-transporting device according to claim 1, wherein the first transfer means and/or the second transfer means are equipped with a pair of discs or a column having on its circumferential surface concave parts or convex parts capable of guiding and transferring the block while engaging therewith.

16. The chainless container-transporting device according to claim 1, wherein the first transfer means and/or the second transfer means are equipped with a U-shaped connection block-support member connected to the outward block-support member or the homeward block-support member.

17. The chainless container-transporting device according to claim 16, wherein the connection block-support member is a connection guide rail having a rectangular cross-section.

18. The chainless container-transporting device according to claim 16, wherein the connection block-support member has a roller for reducing the slide-friction factor at a part in contact with the block.

19. The chainless container-transporting device according to claim 18, wherein the roller is provided on a linear part near a bent part of the U-shaped connection block-support member.

20. The chainless container-transporting device according to claim 19, wherein the roller provided on both the linear parts flanking the bent part of the U-shaped connection block-support member, is provided in a larger number on the downstream-side linear part compared to the upstream-side linear part.

21. The chainless container-transporting device according to claim 1, wherein the first transfer means and/or the second transfer means have a U-shaped guide member for supporting the blocks from the inner side and/or outer side of the blocks.

22. The chainless container-transporting device according to claim 1, wherein the container holder is constituted by a holding part for holding at least two opposing angular corners of a square-cylindrical container.

23. The chainless container-transporting device according to claim 1, wherein the adjacent blocks are connected with a permanent magnet.

24. The chainless container-transporting device according to claim 1, which is equipped with a container-support member situated on the lower side of the transported container, for providing a bottom support for the container.

25. The chainless container-transporting device according to claim 1, wherein an upwardly and downwardly penetrating opening is formed at a given position of the container-support member, and a container lifting-and-lowering means is equipped, which means being capable of inserting through the opening a container lifting-and-lowering member for pushing up the container from the bottom part to the upper side and for lowering it to its original position.

26. The chainless container-transporting device according to claim 1, wherein the device is constructed to be equipped on a filling-and-packaging machine for filling and packaging content in the container.

\* \* \* \* \*